June 2, 1970 K. METCALFE 3,515,393
FACE SEALS
Filed Oct. 10, 1967 3 Sheets-Sheet 1
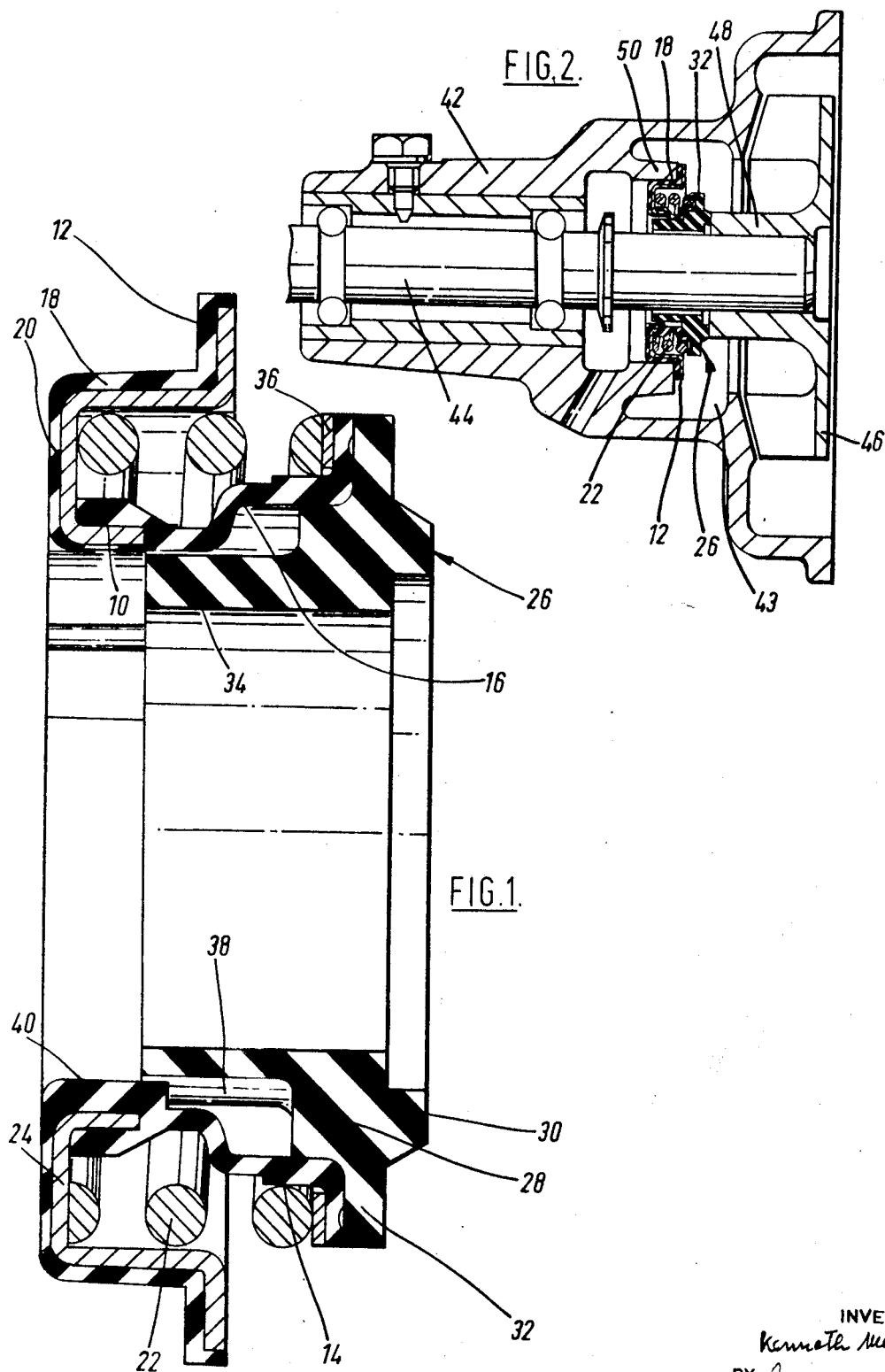
INVENTOR:
Kenneth Metcalfe
BY Ernest J. Montague
Attorney

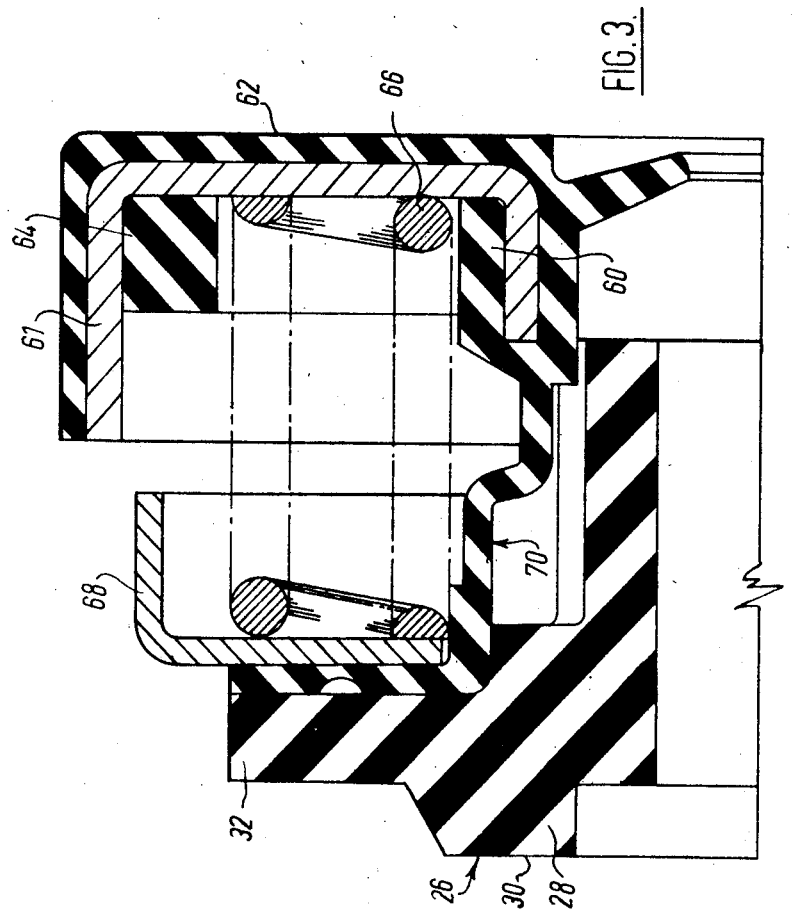

June 2, 1970  K. METCALFE  3,515,393
FACE SEALS

Filed Oct. 10, 1967  3 Sheets-Sheet 3

INVENTOR:
Kenneth Metcalfe
BY
Attorney

United States Patent Office 3,515,393
Patented June 2, 1970

3,515,393
FACE SEALS
Kenneth Metcalfe, Nelson, England, assignor to Pioneer Oilsealing & Moulding Company Limited, Yorkshire, England, a British company
Filed Oct. 10, 1967, Ser. No. 674,254
Claims priority, application Great Britain, Oct. 11, 1966, 45,281/66; June 23, 1967, 28,987/67
Int. Cl. F16j 9/00, 15/40
U.S. Cl. 277—42                    3 Claims

ABSTRACT OF THE DISCLOSURE

The invention concerns a safe seal assembly for maintaining a sealed rotary boundary between contiguous compartments containing different fluids. The assembly has an annular seal for seating in a recess of a housing containing the fluid compartments, a carrier member extending axially from the annular seal and a face seal supported by the carrier member and engageable with a rotary component of the housing, and the invention is particularly directed to the provision in the face seal, of opposed axial faces which in use are simultaneously exposed to the same fluid pressure in one of said compartments in order to impart a pressure-balanced characteristic to the assembly.

---

The present invention concerns seals and relates more particularly to so-called face seals.

These seals are commonly used, for example to provide fluid tight sealing at a region where a shaft penetrates the boundary between contiguous but independent fluid compartments. Such a situation occurs for instance, in a vehicle water pump, where the shaft passes from its bearing compartment in the pump housing into the pumping chamber. A similar situation arises in a washing machine where the agitator or equivalent member situated in the washing compartment is connected to the driving shaft.

The essential components of a face seal assembly are an annular seal for engaging a stationary part such as a pump or the like housing and the face seal itself, constituting a closure member resiliently urged against an annular flanged hub or similar element on the shaft to be sealed. In conventional assemblies of this nature the several components are separate from one another and require separately to be positioned and located in the overall assembly in its operational position. Moreover, the face seal or closure member itself is usually so arranged that, where it is used to seal in a liquid environment, the liquid pressure is applied substantially to only one axial end face of the seal. Since the resilient force, usually a spring force, urging the face seal against its cooperating sealing surface is a constant, any variations in the liquid pressure applied to the face seal cause corresponding variations in the loading of that seal against its cooperating surface.

It is one object of the present inventiton to avoid the disadvantages referred to immediately above.

It is another object of the present invention, to provide a face seal assembly which comprises an annular face seal or closure member having substantially commensurate, opposed axial end areas which are simultaneously subjected to the pressure of the fluid being sealed whenever said assembly is exposed to said fluid. In this way, variations in pressure in the liquid being sealed are automatically balanced out, so far as concerns the face seal itself, so that any resilient loading exerted on the face seal as by an appropriate spring remains substantially constant.

The seal assembly may conveniently comprise an annular seal for engaging a stationary component such as a pump housing and a co-axial carrier member supported by and extending from the annular seal, said seal and the carrier member being secured together as by bonding. The carrier member then provides a mounting for the face seal or closure member itself which, since it is intended to cooperate with a moving part such as a shaft or an element rotating therewith, is preferably of a relatively harder material having good sliding friction properties for enabling it to have satisfactory bearing and sealing contact with that moving part. The carrier member may itself be resilient to provide the resilient loading force for the face seal and/or it may be assisted by a spring acting between it and the annular seal.

With these and other objects in view which will become apparent in the following detailed description, the present invention, which is shown by example only, will be clearly understood in connection with:

FIG. 1 is an axial section through a water pump face seal assembly embodying the present invention;

FIG. 2 is a similar section through a part of a water pump incorporating the face seal of FIG. 1;

FIG. 3 is an axial section through a modified seal similar to that shown in FIG. 1;

Figure 4:
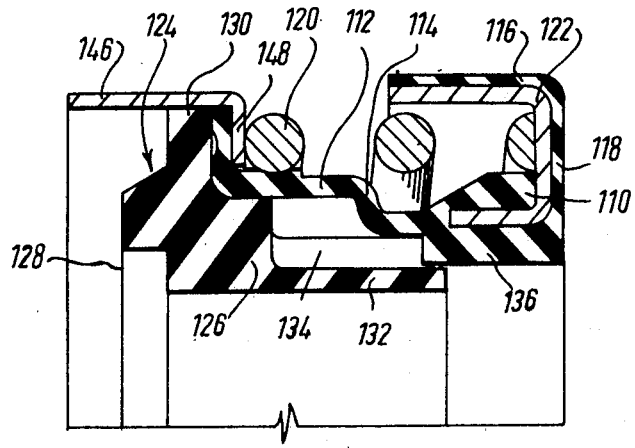
FIG. 4 is an axial section through a water pump face seal assembly embodying the present invention.

Referring firstly to FIG. 1 the face seal assembly illustrated therein comprises an annular body 10 carrying at one end a radially outwardly directed flange 12 and extending axially at the other end beyond the flange 12 in the form of an outwardly flanged cylinder or coaxial carrier member 14 of somewhat greater diameter than the body 10 and joined thereto by a fold or bend 16. The radial flange 12 is joined to the body 10 by axially and radially directed seal portions, namely, annular seal 18 and an integral connection 20, respectively which cooperate with the body to define an integral annular seal member providing a recess of U-section wherein is received a compression spring 22. In the illustrated embodiment of the present invention, the annular seal member is reinforced by and in manufacture is molded around a correspondingly cup shaped metal shell 24, having an innermost and outermost cylindrical portion 24a and 24b, respectively, and an annular portion 24c which provides a seating for a spring 22. The function of the metal shell is to stabilize the configuration of the annular seal member and to provide a stable seating for the spring. The annular seal 18 forms an engaging outer periphery 18a of elastometric material adapted to engage a pump housing (FIG. 2).

A face seal or closure member generally designated 26 comprises an annular portion 28 formed at one end with a radially directed sealing face 30 and a radially outwardly directed flange 32. The flange 32 and the contiguous part of the closure member 26 are formed to fit closely within the radially flanged cylinder 14, which thus constitutes the carrier member for supporting the closure member, and to further stabilize that support, the face seal or closure member is provided with a skirt 34 of lesser diameter and extending rearwardly from the annular portion 28, so as to engage snugly within the body 10 of the annular seal. Preferably, a washer 36 of a harder material such as brass is interposed between the spring 22 and the radial flange of the carrier member 14 to prevent deformation of the closure member 26 by the spring. The closure member as illustrated is made of a phenolic resin but it will be appreciated that many materials may be used dependent upon the environmental conditions in which the assembly is required to work. Thus, various plastic materials such as nylon or polytetrafluorethylene are within the scope of the invention, as are face seals or closure member of hardened graphite, bronze and so forth, in each instance either inherently self-lubricating or externally lubricated if required. The annular seal is conveniently made of a synthetic rubber, but natural rubber or other elastomers may be substituted where required.

The integral connection 20 between the annular seal 18 and the carrier member 14 in part constitutes a flexible bellow of elastomeric material.

Since the annular seal 18 and the carrier member 14 are, in effect, one component with the metal shell 24 embedded therein, they cooperate with the spring 22, washer 36 and the face seal or closure member 26 to act as one unit once they have been assembled together, thereby in turn facilitating their assembly in items such as pumps where they may be required for use. In this connection, in such environmental circumstances it can sometimes happen that a bond is created, between the face 30 of the seal 26 and its counterface in the item being sealed, particularly if the two are relatively stationary over an extended period. This can have the consequence that the face seal 26 may itself be liable to rotate with its counterface, when it is again put into operation. In the present invention this is avoided by axially grooving or otherwise recessing the skirt 34 of the face seal as indicated at 38 and providing the body member 10 of the annular seal with radially inwardly directed and axially extending protrusions 40 which engage those recesses. The face seal and body member are thus held relatively stationary, while the resilient nature of the protrusions 40 provides a cushion between the face seal and the body member to absorb rotary shock or impulse forces which may arise between the two.

FIG. 2 illustrates the seal installed in a water pump having a pump housing 42 carrying an axially extending shaft 44 terminated at one end of the housing 42 in an impeller 46. The face seal 26 will be seen to engage a hub 48 of the impeller while the flange 12 and axial wall 18 engage an annular flange 50 of the pump housing circumscribing the shaft 44. It will be particularly noted that the flange 32 of the face seal 26 is situated in a fluid chamber 43 of the pump housing 42 and is exposed on both its axial faces to the liquid pressure prevailing in the chamber 43. In this sense, the seal is pressure balanced, pressure variations do not affect it, and the loading of the seal 26 against its counterface on the hub 48 is determined solely by the spring 22.

The seal illustrated in FIG. 3 differs from that shown in FIG. 1 primarily in the use of a plurality of circularly spaced, individual springs to provide a resilient loading force for the face seal 26. As indicated in FIG. 3, an annular seal 60 is formed behind its sealing face 62 with a number of pockets 64, one such pocket being visible in the drawing. Each pocket 64 houses one end of a compression spring 66 seated on a metal reinforcement 61 of the seal 60, the other end of the spring 66 abutting against a flanged reinforcing ring 68 of a carrier member 70 extending axially from the annular seal 60. The carrier member supports the face seal 26 as in the embodiment previously described.

Referring now to FIG. 4, the face seal assembly illustrated therein comprises an annular body 110 extending axially at one end in the form of an outwardly flanged cylinder 112 joined to the body by a fold or bend 114. At the other end of the body 110, axially and radially directed seal portions 116 and 118 cooperate with the body to define a recess of U-section wherein is received a compression spring 120 seated on a reinforcing metal shell 122.

A face seal or closure member generally designated 124 comprises an annular portion 126 formed at one end with a radially directed sealing face 128 and a radially outwardly directed flange 130. A skirt 132 extending rearwardly from the annular portion 26 engages snugly within the body 110 of the annular seal. The skirt 132 is axially grooved or otherwise recessed as indicated at 134 and the body member 110 of the annular seal is provided with cooperating radially inwardly directed and axially extending protrusions 136 which engage those recesses.

Figure 5:
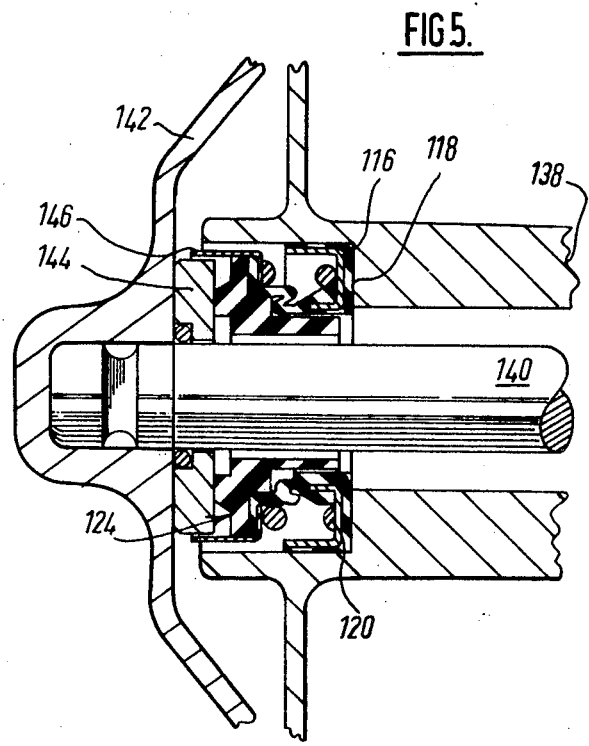
FIG. 5 is an axial section through a part of a washing machine water pump incorporating the face seal of FIG. 1.

FIG. 5 illustrates the seal of FIG. 4 installed in a washing machine water pump having a pump housing 138 carrying an axially extending shaft 140 terminated at one end of the housing 138 in an impeller 142 or other pump member. The face seal 124 will be seen to engage a counterface member 144 of the impeller whilst the axial wall 116 and radial wall 118 engage a shoulder 146 of the pump housing circumscribing the shaft 140.

In an environment such as washing machine water, it will be appreciated that lint and strands of textile material and other foreign matter continually surround the junction between the face seal 124 and the counterface member 144. Should any foreign matter penetrate the seal faces, the effectiveness of the seal can become seriously impaired. Accordingly, a cylindrical and axially extending shroud 146 is arranged closely to encircle the seal 124 and counterface member 144 and projects well beyond the junction between the two to cooperate with the counterface member in defining a very small clearance through which damaging foreign matter cannot pass. One end of the shroud 146 is radially inwardly flanged at 148 and the shroud flange 148 together with the outward flange of the cylinder 112 is urged against the flange 130 of the face seal 24 by the spring 120. The cylindrical portion of the shroud is dimensioned to have an internal diameter just sufficiently greater than the external diameter of the counterface member 124 to permit relative rotation between the two.

Conveniently, the shroud 146 is made of thin brass but it may be made of other materials, for example, it may be moulded as a plastics material.

Although the seal shown in FIGS. 4 and 5 has been described as applied to a washing machine pump, it will be appreciated that it may be employed in any situation wherein a face seal assembly requires protection from a contaminated fluid environment. Thus, it may be used in agricultural equipment such as grass cutters and lawnmower to prevent the seal being damaged by strands of grass. Again, it finds applications in textile machinery where there is danger of textile fly penetrating the seal faces.

While I have disclosed several embodiments of the present invention it is to be understood that these embodiments are given by example only and not in a limiting sense.

I claim:
1. A fluid face seal assembly for maintaining a sealed rotary boundary between contiguous compartments in a housing containing different fluids, said assembly comprising
   an annular seal having an engaging outer periphery adapted for engaging said housing,
   a coaxial carrier member, substantially radially inwardly spaced from said annular seal,
   an integral connection between said annular seal and said carrier member,
   said seal, said carrier member and said integral connection comprising an integral elastomeric structure, and
   said integral connection constituting a flexible bellow between said seal and said carrier member,
   a metal shell substantially conforming to the shape of said annular seal and said integral connection, including an innermost and an outermost cylindrical portion, said elastomeric structure completely cover- ing peripherally said metal shell at said engaging outer periphery, at least one of said cylindrical portions being embedded in said elastomeric structure, an annular face seal carried by said carrier member and having substantially commensurate opposed axial end areas, and the latter being simultaneously subjected to the pressure of one of said fluids and sealed whenever said assembly being exposed to said one of said fluids.

2. The fluid face seal assembly, as set forth in claim 1, wherein said metal shell including an annular portion integrally connecting said innermost and said outermost cylindrical portions, thereof, said metal shell having a cup shape defined by said innermost cylindrical portion, said annular portion and said outermost annular portion, a helical spring coaxially positioned in said integral elastomeric structure and compressed between and abutting said annular portion of said metal shell, at one end, and operatively pressed against said carrier member at its other end.

3. The fluid face seal assembly, as set forth in claim 1 wherein said integral elastomeric structure includes radially inwardly directed and axially extending protrusions or driving ribs of an elastomeric nature, and said annular face seal extending inwardly of said integral elastomeric structure and formed with recess complementing to said ribs, the latter inserted therein in order to obtain silent operation upon relative rotation.

References Cited

UNITED STATES PATENTS

| 2,598,886 | 6/1952 | Brummer | 277—42 |
| 2,892,642 | 6/1959 | Payne | 277—42 |
| 3,189,357 | 6/1965 | Talamonti | 277—42 |
| 3,218,086 | 11/1965 | Donley | 277—96 |
| 3,314,681 | 4/1967 | Talamonti | 277—42 |

FOREIGN PATENTS

| 1,019,025 | 2/1966 | Great Britain. |
| 1,031,189 | 6/1966 | Great Britain. |
| 1,450,663 | 7/1966 | France. |
| 998,478 | 7/1965 | Great Britain. |

JAMES KEE CHI, Primary Examiner

U.S. Cl. X.R.

277—96